United States Patent
Fomkin et al.

(10) Patent No.: US 12,478,950 B2
(45) Date of Patent: Nov. 25, 2025

(54) ORGANOMETALLIC COORDINATION POLYMER FOR ACCUMULATION OF NATURAL GAS, METHANE AND THE METHOD FOR PRODUCTION THEREOF

(71) Applicant: PUBLICHNOE AKTSIONERNOE OBSCHESTVO "GAZPROM", Saint-Petersburg (RU)

(72) Inventors: Anatolii Alekseevich Fomkin, Moscow (RU); Aslan Usupovich Tsivadze, Moscow (RU); Marina Konstantinovna Kniazeva, Krasnodarskii Krai (RU); Olga Viacheslavovna Solovtsova, Moscow (RU); Andrei Viacheslavovich Shkolin, Khimki (RU); Ilia Evgenevich Menshchikov, Moscow (RU); Oleg Yevgenievich Aksiutin, Moscow (RU); Aleksandr Gavrilovich Ishkov, Moscow (RU)

(73) Assignee: PUBLICHNOE AKTSIONERNOE OBSCHESTVO "GAZPROM", Saint-Petersburg (RU)

( * ) Notice: Subject to any disclaimer, the term of this patent is extended or adjusted under 35 U.S.C. 154(b) by 0 days.

(21) Appl. No.: 17/928,145

(22) PCT Filed: May 16, 2022

(86) PCT No.: PCT/RU2022/000158
§ 371 (c)(1),
(2) Date: Nov. 28, 2022

(87) PCT Pub. No.: WO2023/085971
PCT Pub. Date: May 19, 2023

(65) Prior Publication Data
US 2024/0238756 A1    Jul. 18, 2024

(30) Foreign Application Priority Data

Nov. 15, 2021  (RU) ............................. 2021133260

(51) Int. Cl.
*B01J 20/22* (2006.01)
*B01J 20/28* (2006.01)
*B01J 20/30* (2006.01)

(52) U.S. Cl.
CPC ....... *B01J 20/226* (2013.01); *B01J 20/28047* (2013.01); *B01J 20/28066* (2013.01);
(Continued)

(58) Field of Classification Search
CPC ............... B01J 20/226; B01J 20/28047; B01J 20/28066; B01J 20/28073; B01J 20/2808;
(Continued)

(56) References Cited

U.S. PATENT DOCUMENTS

| 7,202,385 | B2 | 4/2007 | Mueller |
| 9,878,906 | B2 | 1/2018 | Schubert |
| 9,925,516 | B2 | 3/2018 | Fuller |

FOREIGN PATENT DOCUMENTS

| RU | 2457213 C1 | 7/2012 |
| RU | 2578599 C1 | 3/2016 |

OTHER PUBLICATIONS

Batrakova (Synthesis and Structure–Energy Characteristics of an MOF AI-BTC Organometallic Framework Structure,) (Year: 2017).*

* cited by examiner

*Primary Examiner* — Daniel C. Mccracken
*Assistant Examiner* — Starfari Teshawn Mcclain
(74) *Attorney, Agent, or Firm* — Notaro, Michalos & Zaccaria P.C.

(57) ABSTRACT

The invention relates to a method for production of an organometallic coordination polymer and to a material
(Continued)

Figure 1:
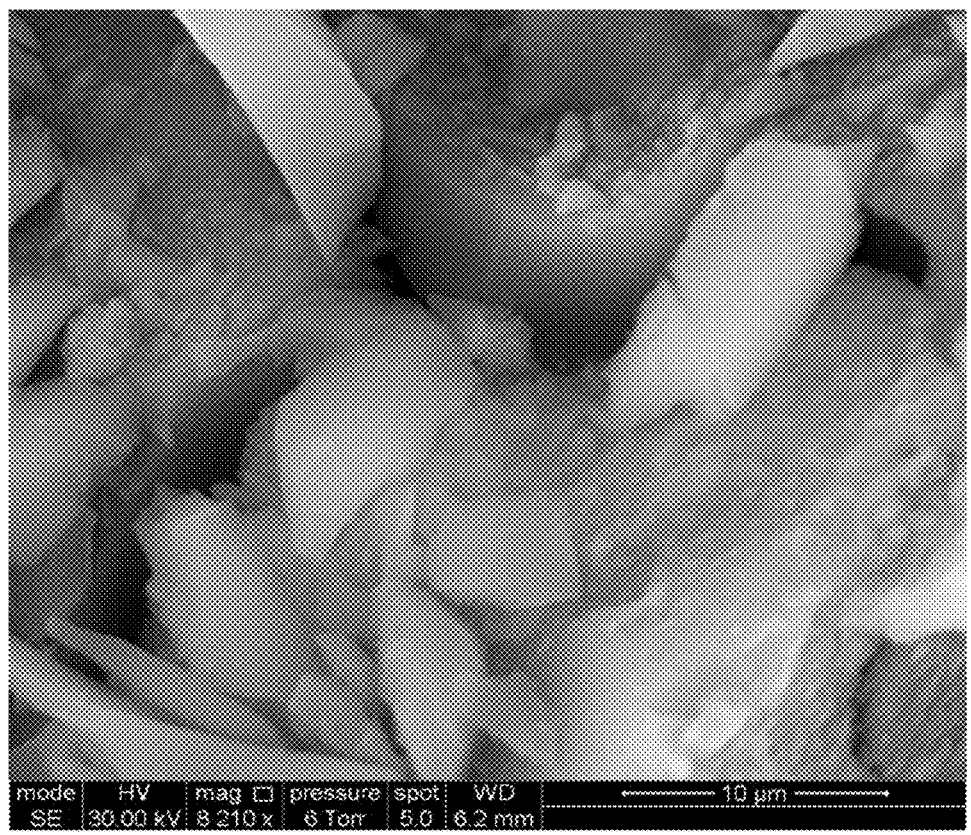

obtained using the method provided. Synthesized according to the method, this organometallic coordination polymer has gel structure and is characterized by availability of nanopores with the effective diameter of 0.75-0.80 nm, specific area of 1300 to 1700 $m^2/g$, micropore volume of 0.5-0.6 $cm^3/g$, and increased thermal stability. The method of synthesis allows for reduction of material consumption during the process by using a single solvent at the synthesis and activation stages, for reduction of time for the production of polymer gel that is characterized by availability of active meso and micropores which will make it possible to use it as a base in various absorption processes including natural gas storage systems.

2 Claims, 3 Drawing Sheets

(52) U.S. Cl.
CPC ..... B01J 20/28073 (2013.01); B01J 20/2808 (2013.01); B01J 20/3071 (2013.01)

(58) Field of Classification Search
CPC .............. B01J 20/3071; B01J 20/28076; B01J 20/3078; B01J 20/3085; F17C 11/007
See application file for complete search history.

ORGANOMETALLIC COORDINATION POLYMER FOR ACCUMULATION OF NATURAL GAS, METHANE AND THE METHOD FOR PRODUCTION THEREOF

This group of inventions relates to a technology of production of organometallic polymers, in particular, to an organometallic polymer based on aluminum ions coordinated with ligands of trimesic acid that is synthesized by solvothermal method and may be applied for accumulation of gases, in particular, in systems for storage and transportation of natural gas, methane.

Organometallic polymers, also known as organometallic structures, represent the class of porous adsorbents consisting of ions or metal clusters coordinated with polyorganic ligands (linkers). Wide range of organic ligands in combination with different metal cations results in vast variability of potential porous materials with a wide specter of porous surface properties and chemically regulated structures that have been critically assessed in terms of application variants more than once, including storage and separation of gas. Patent (U.S. Pat. No. 7,202,385, IPC C07C41/03; C07C43/11; C08G18/28; C08G65/26; C08G65/28) discloses the majority of structures described in literature which illustrates diversity of organometallic polymers already in existence.

Organometallic polymers are characterized by unique structural and energy features including regular crystalline structure, high specific surface (up to 10000 $m^2/g$) and high micropore volume that often exceeds similar characteristics of zeolites and activated carbons, and they are used as highly efficient adsorbents, for example, for storage and separation of gas [T. A. Makal, J. R. Li, W. Lu, H.-C. Zhou Methane storage in advanced porous materials//Chem. Soc. Rev. 2012. V.41. P.7761-7779].

Production of high-performance organometallic polymers that can be used in gas storage and transportation systems requires them to possess not only appropriate adsorption characteristics, but also a thermal stability.

The most known and widespread organometallic polymer with a potential to store and separate gases including methane [A. Yu. Tsyvadze, O. Ye. Aksyutin, A. G. Ishkov, A. A. Fomkin, I. Ye. Menshchikov, A. A. Pribylov, V. V. Isayeva, L. M. Kustov, A. V. Shkolin, Ye. M. Strizhenov. Adsorption of methane on the organometallic framework structure MOF-199 under high pressures within the range of supercritical temperatures, Physicochemistry of surface and material protection. 2016. Vol. 52 No. 1. P. 24-29]. [Baichuan Sun, Sibnath Kayal, Anutosh Chakraborty, Study of HKUST (Copperbenzene-1,3,5-tricarboxylate, Cu-BTCMOF)-1 metalorganic frameworks for $CH_4$ adsorption: An experimental Investigation with GCMC (grandcanonical Montecarlo) simulation, Energy (2014), 1-9] is MOF-199 related to HKUST-1 family, for example, disclosed in patent (U.S. Pat. No. 9,925,516, IPC B01D53/02; B01J20/22; B01J20/28). However, the MOF-199 structure is not thermally stable enough which is dictated by the strength of metal and ligand bonds, since in case of MOF-199, a divalent copper cation Cu(II) is used. This problem can be solved by replacement of the divalent copper cation with another cation having higher valency.

The most preferable for this problem would be the use of a trivalent aluminum cation Al (III), since organometallic polymers on the basis of aluminum have high thermal stability and mechanic strength, developed micropore volume for gas accumulation, as well as relatively low production cost, for example, in comparison with organometallic polymers based on zirconium Zr (IV) or titanium Ti (IV) with similar mechanical properties.

Among the methods for synthesis of organometallic polymers, there are, as a rule, modifications of two of the most well-known methods: solvothermal, for example [RU 2457213 C1, IPC C07F 11/00 published on 27 Jul. 2012] and using UHF, for example, patent [RU 2578599 C1, IPC C08F 293/00, B01J 32/00].

Solvothermal method partially described in the patent of the Russian Federation RU 2457213 includes mixing of base components, in particular, chromic nitrate (III) and terephthalic acid in an aqueous solution when heated. Heating is carried out in a closed container at the rate of 11.5°/min up to 220° C. with further holding.

Method for production of coordination polymer under UHF, for example, in RU 2578599 comprises mixing of aluminum salt from $AlCl_3 \times 6H_2O$ compound and organic 2-amino-1,4-benzen dicarboxylic acid with addition of the mixture of water and polar organic solvent taken at the weight ratio of 1:1÷5 respectively. Then, the reaction mix obtained is heated at atmospheric pressure and temperatures of 120-130° C. under 200 W UHF radiation. A solvent with boiling temperature over 130° C. is used as a polar organic solvent that can be effectively heated under UHF radiation, for example, dimethyl sulfoxide, N,N'-dimethyl formamide or N,N'-diethyl formamide.

The disadvantage of the approaches described is that they allow for obtainment of non-activated organometallic polymers that require labor intensive selection of conditions of activation for removal of the solvent residue with maintenance of the material structure to be used as gas absorbents.

The closest analogue by essence and the result achieved is the method [U.S. Pat. No. 9,878,906 B2, IPC C01B 3/00, B01D 53/02 published on 30 Jan. 2018] that comprises interaction during mixing and under pressure not exceeding 2 bar (absolute), at least one metal compound with at least one at least bidentate organic compound that may be coordinated with metal in presence of a non-aqueous organic solvent selected from DMF, DEF and NMP, with generation of porous organometallic structure wherein metal is represented by Mg, Ca, Be, Sr, Ga or Al; and an organic compound having at least two atoms selected from oxygen, sulfur or nitrogen through which the organic compound can be coordinated with metal wherein at least one bidentate organic compound is represented by a di-, tri- or tetracarboxylic acid. Reaction shall be carried out without additional base, and formed organometallic framework shall be additionally calcinated under a temperature not exceeding 250° C. Example 13 of the present invention is the closest analogue to the result achieved. Within it, synthesis of the framework organometallic polymer with N,N'-dimethyl formamide solvent is carried out that includes dissolving 7.8 g of trimesic acid (BTC) and 22.9 g of $Al(NO_3)_3 * 9H_2O$ in 520.5 g of N,N'-dimethyl formamide at 130° C. and holding for 4 days, with stirring of the suspension obtained that shall be filtrated twice by washing with 100 ml N,N'-dimethyl formamide and four times with 100 ml of methanol. Then, the filter with the substance precipitated on it shall be dried using thermal vacuum drying at the temperature of 200° C. for 16 hours. Organometallic framework powder obtained shall be annealed at 330° C. for activation in a muffle furnace, with air purging at the rate of 100 l/hour for 3 days. Herewith, the furnace heating up rate is 75 deg./hour The framework organometallic polymer obtained that is based on aluminum has a specific surface of 1791 $m^2/g$ which is determined according to the Langmuir method.

The objective of the present group of inventions was development of the method for synthesis of an organometallic coordination polymer with an organometallic gel structure based on aluminum ions coordinated with trimesic acid ligands that would have a developed nanopore surface and elevated thermal stability allowing for the use of the organometallic gel obtained as an adsorbent in the systems for transportation and storage of gas, in particular, natural gas, methane.

The technical result to be achieved by the group of inventions is:
production and maintenance of the gel structure of the organometallic coordination polymer to be synthesized;
improvement of its thermal stability;
reduction of material and energy costs of production by reduction of synthesis time and use of a single solvent at the synthesis and washing stages.

The technical result is achieved by the fact that, in the method for production of organometallic coordination polymer for accumulation of natural gas, methane, comprising the stage of synthesis that consists of interaction of equimolar amounts of the crystalline hydrate of aluminum nitrate and trimesic acid dissolved in an aprotonic polar organic solvent with boiling temperature over 80° C. taken in equimolar or excessive amount related to reagents; however, the solution of the aluminum nitrate crystalline hydrate is heated up to 110° C., the solution of trimesic acid is heated up to 80-110° C., and the heated trimesic acid solution is added dropwise to the heated aluminum nitrate solution with intensive stirring at the rate of 5-15 vol. % per minute, and the solution mix is heated up to 140° C. at the rate of 10-15° C. an hour, held until sol is generated, and the latter is put into an autoclave and held therein at 100-150° C. for 2-3 days until organometallic coordination polymer with gel structure is obtained; and the activation stage consisting of washing of the synthesized organometallic coordination polymer with gel structure with an aprotonic polar organic solvent used at the synthesis stage and heated up to 40-60° C., with a vacuum-generating filtering system at pressure drop of at least 90 kPa, drying at room temperature, drying in a drying furnace under 100-150° C., installation in a thermal vacuum chamber at 120-300° C. and residual pressure of 0.26 kPa; the activation stage is terminated upon stabilization of the weight of organometallic coordination polymer with the gel structure.

Organometallic coordination polymer with the gel structure for accumulation of natural gas, methane, that is thermally stable at temperatures of at least 500° C. and has pores with effective inner diameter of 0.75-0.80 nm, specific area of 1300 to 1700 m$^2$/g, micropore volume of 0.5-0.6 cm$^3$/g, and total micropore volume of 1.0-1.8 cm$^3$/g.

The group of inventions is explained in Tables and Figures:
Table 1—Chemical Composition of the Organometallic Gel Synthesized, where: Wt—weight percent, At—atom percent;
Table 2—Parameters of the Porous Structure of the Organometallic Gel Specimens Synthesized, where: $V_0$—specific micropore volume, cm$^3$/g; $E_0$—nitrogen adsorption characteristic energy, kJ/mol; D—micropore effective inner diameter, nm; E—benzene adsorption characteristic energy, kJ/mol; $S_{BET}$—specific surface area as per BET method, m$^2$/g; $V_s$—summarized pore volume, cm$^3$/g; $S_{me}$—mesopore area, m$^2$/g; $V_{me}$—mesopore volume, cm$^3$/g.

Figure 2:
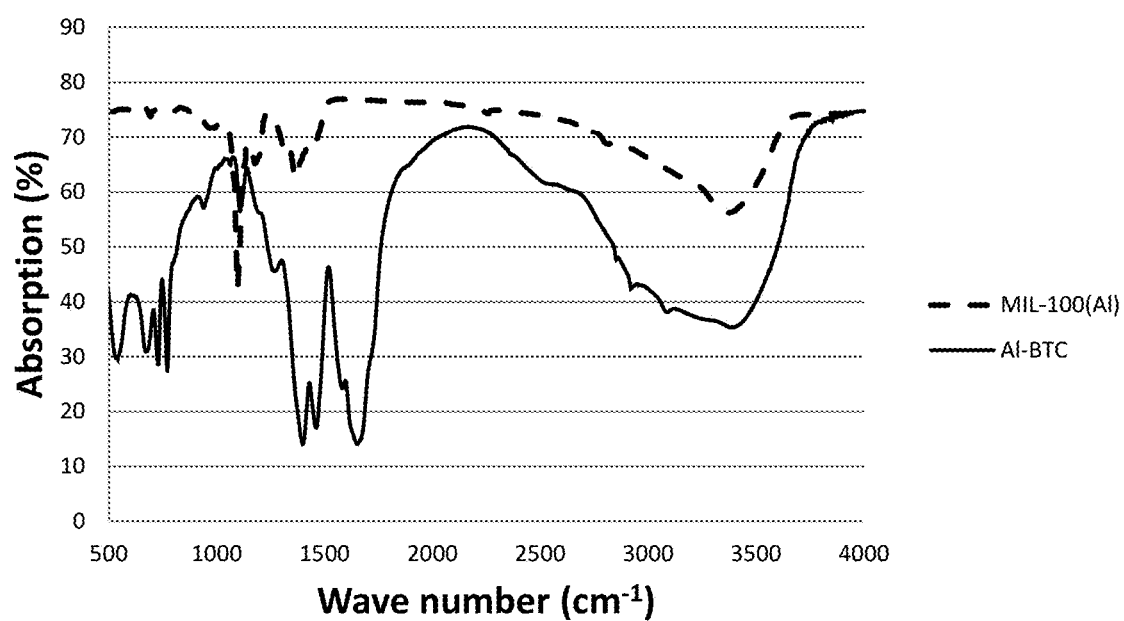
Figure 3:
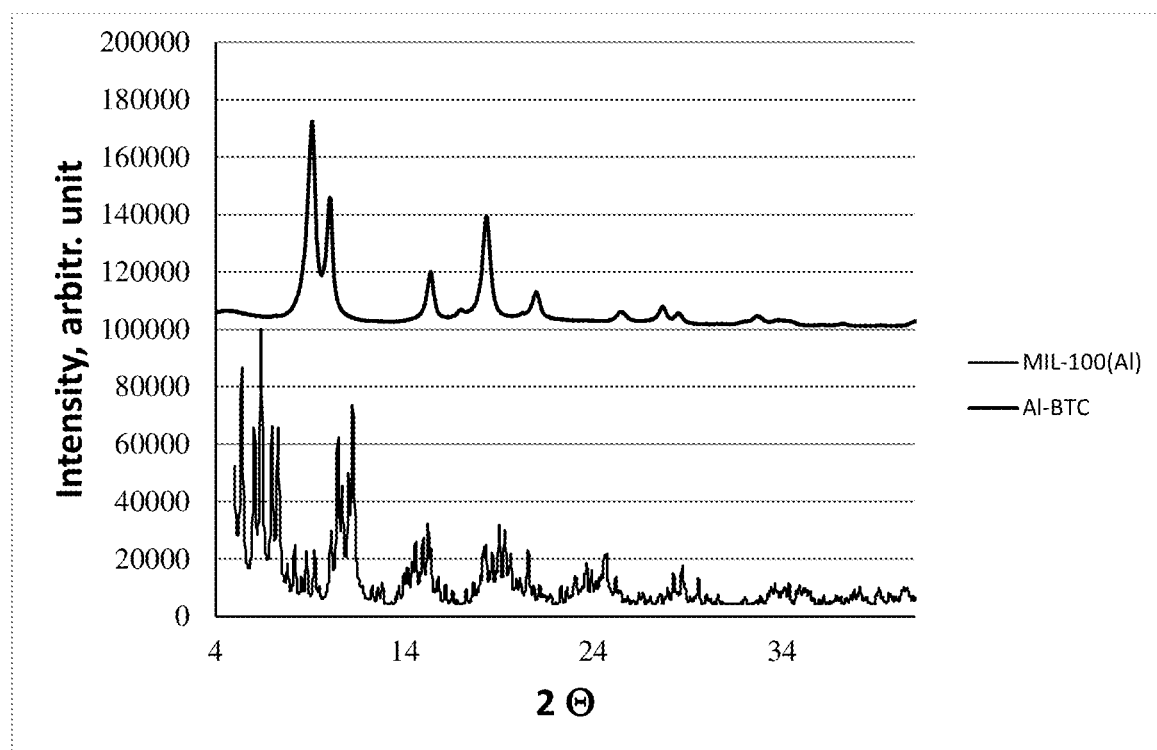
Figure 4:
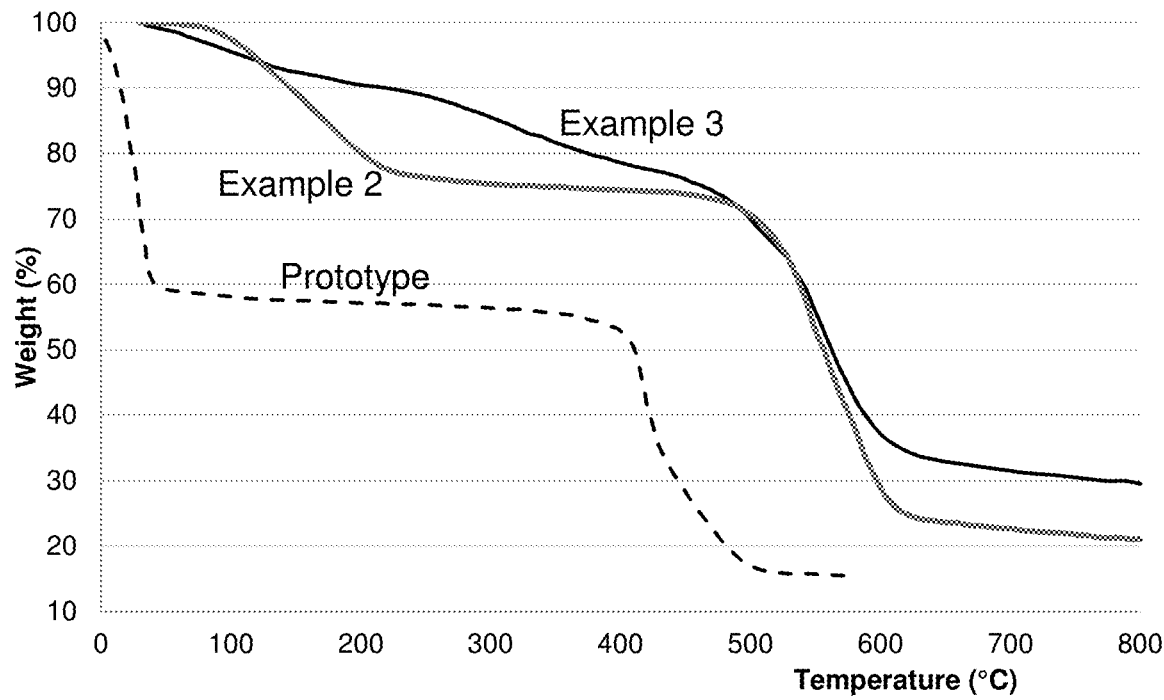
Figure 5:
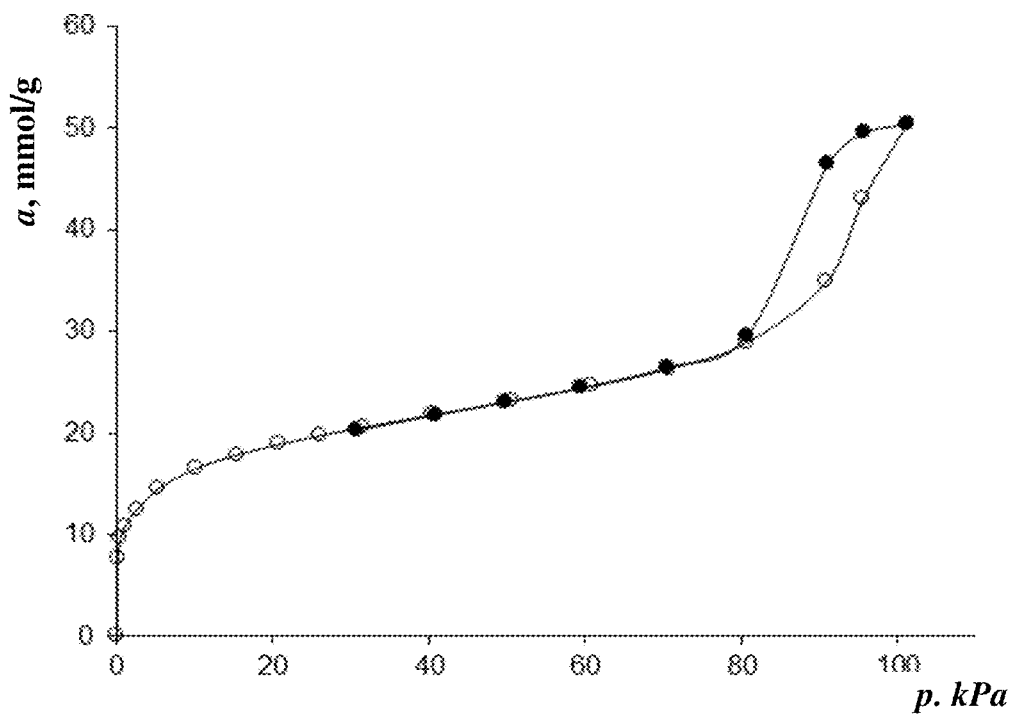
Figure 6:
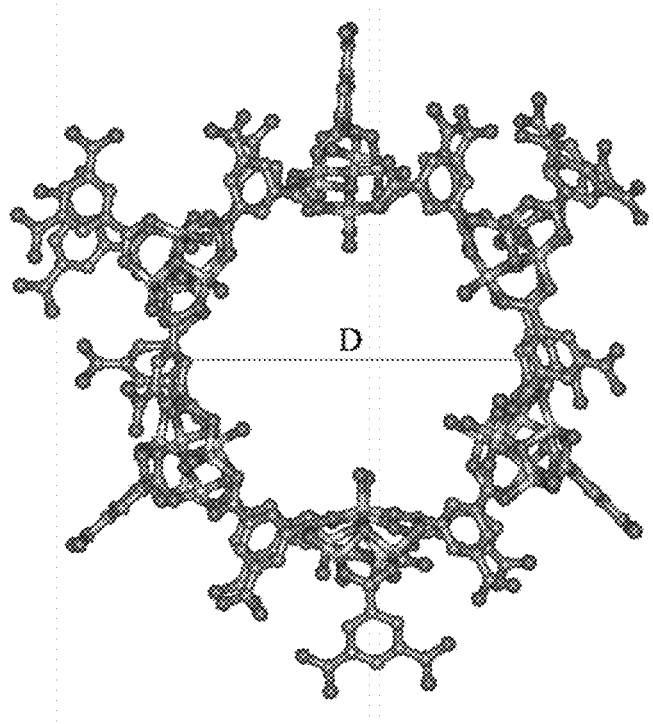

FIG. 1—electronic scanning microscopy photograph of the specimen of organometallic coordination polymer with gel structure obtained;
FIG. 2—IR specters of the synthesized organometallic coordination polymer with gel structure—solid line; organometallic polymer based on aluminum (prototype)—dashed line.
FIG. 3—diffraction patterns of the synthesized organometallic coordination polymer with gel structure—top line; organometallic polymer based on aluminum (prototype)—bottom line.
FIG. 4—thermograms: solid line—synthesized specimen of organometallic coordination polymer with gel structure; dashed line—organometallic polymer with gel structure based on aluminum (prototype).
FIG. 5—isothermal curve of nitrogen adsorption/desorption at 77 K on the specimen (1). Light symbols—adsorption. Dark symbols—desorption.
FIG. 6—framework model of the fragment of the synthesized organometallic coordination polymer where D is the micropore effective inner diameter.

The group of inventions proposed is implemented as follows.

EXAMPLE 1

Trimesic acid (1,3,5-benzen tricarboxylic acid (H$_3$BTC)) and aluminum nitrate crystalline hydrate Al(NO$_3$)$_3$·9H$_2$O were dissolved in the organic solvent N,N'-dimethyl formamide with molar ratio of 1:1 (1 mol of acid per 1 mol of solvent, and 1 mol of salt per 1 mol of solvent). Obtained solutions were heated up (up to 110° C. for aluminum salt solution and up to 80° C. for trimesic acid solution). Then, heated up solution of trimesic acid was added dropwise to the aluminum salt solution at the rate of 5-15 vol. %/min, with intensive stirring using a magnetic stir bar and gradual increase in the reaction mix temperature up to 140° C., and it was held until sol would be formed (solution thickening). Obtained sol was placed in an assay autoclave with a tight screwed cover and fluoroplastic liner after which it was placed in a furnace where synthesis at 100° C. was carried out, with gradual heating up to 140°, and it was held for two days. Activation was carried out as follows: organometallic gel (OMG) residue that formed was separated from the mother liquor by thermal vacuum filtration (desorption of solvent molecules), in particular, by multiple washing with solvent (150 ml N,N'-dimethyl formamide heated up to 60° C.) under vacuum conditions, at pressure drop of at least 90 kPa. Then, the residue was dried first under standard conditions, and then in a drying furnace at 100° C., with increase up to 140° C. during 20 h, and it was held at 140° C. for 4 more hours. Under such drying conditions, surface moisture is removed first (at 100° C.), and then the interstitial unbound moisture (100-140° C.) is removed which allows for stabilizing the synthesized OMG framework. OMG specimen obtained was activated for maximum removal of interstitial bound (crystalline hydrate) moisture and solvent in a thermal vacuum chamber at the temperature of 200° C. and residual pressure of 0.26 kPa (2 mm Hg) until constant weight is obtained (approximately 6 hours).

The specimen obtained is an organometallic coordination polymer (OMCP) on the basis of aluminum ions coordinated with ligands of trimesic acid, and it has gel structure and the surface chemical composition specified in Table 1. Its physical and chemical properties are confirmed by the assay results illustrated in: FIG. 2—IR specter absorption characteristic of the material; FIG. 3—diffraction pattern; FIG.

4—thermogram; FIG. 5—adsorption isothermal curves. Electronic scanning microscopy photograph of the obtained OMCP specimen with gel structure (FIG. 1) shows availability of crystals of different size and a small amount of amorphous phase between them which demonstrates inhomogeneity of the molar mass distribution of the polymer obtained due to reduction of the time for synthesis thereof in comparison with the prototype. Selection of special activation conditions for maximum removal of both free and bound liquid phase facilitates pore structure keeping and provides for acceptable strength and thermal stability of the OMCP (FIG. 4). Under high aerodynamic load that a natural gas accumulator is affected by during operation, such characteristics are preferable, and this explains the advantages of the polymer gel structure obtained for specific intended use in comparison with the OMCP structures with high degree of crystallinity which are solid, but brittle.

IR specter absorption bands of the synthesized OMCP, FIG. 2, observed within the interval of 663-766 cm$^{-1}$ correspond with the bond vibrations in the benzene nucleus and outside the aromatic ring plane. Bands occurring between 827-1153 cm$^{-1}$ relate to symmetric and asymmetric deformation vibrations O—C=O. Intensive absorption peaks at 1368, 1445 and 1640 cm$^{-1}$ are connected with deformation vibrations of C—O bonds, asymmetric and symmetric types of C=O respectively within—COOH group (in trimesic acid). Such characteristics also show that the OMCP has formed the chemical composition claimed.

Results of thermal stability assay for the synthesized OMCP with gel structure illustrated in FIG. 4 made it possible to determine that its thermal decomposition occurs at temperatures over 500° C. This is the evidence of elevated thermal stability of the polymer obtained in comparison with known organometallic coordination polymers on the basis of aluminum cations coordinated with trimesic acid ligands.

Analysis of the parameters of the synthesized specimen (1) porous structure (see Table 2) of the organometallic gel according to the isothermal curve of the standard nitrogen vapor at the temperature of minus 196.15° C. (77 K), FIG. 5, was carried out by BET method and the theory of volume filling of micropores. Adsorption isothermal curve form is characteristic of micro-mesoporous adsorbents. FIGS. 6 and 7 illustrate framework models of organometallic gel (OMG) fragments that schematically show its geometry and porous characteristics.

EXAMPLE 2

It differs from Example 1 in the fact that the trimesic acid solution was heated up to 110° C., and then it was added to the solution of the aluminum nitrate crystalline hydrate during stirring at the rate of 1 ml/min. Synthesis stage was carried out with temperature increase from 100 to 120° C., and then it was held at 120° C. for 60 more hours. Drying stage in the drying furnace was carried out at the temperature of 100° C., with gradual heating up to 120° C. It was held in the thermal vacuum chamber at 120°. Porous structure assay results for the obtained specimen of organometallic gel (2) are given in Table 2.

EXAMPLE 3

It differs from Example 1 in the fact that trimesic acid and aluminum nitrate crystalline hydrate were dissolved in the organic solvent diethyl sulfoxide with molar ratio of 1:2 (1 mol of acid per 2 mol of solvent, and 1 mol of salt per 2 mol of solvent). Synthesis stage was carried out with temperature increase from 100 to 150° C., and then it was held at 150° C. for 48 more hours. Drying stage in the drying furnace was carried out at the temperature of 100° C., with gradual heating up to 130° C. It was held in the thermal vacuum chamber at 250° C. Porous structure assay results for the obtained specimen of organometallic gel (3) are given in Table 2.

EXAMPLE 4

It differs from Example 1 in the fact that diethyl formamide was used as a solvent, and the synthesis stage was carried out at the temperature of 120° C. during 60 h. Drying stage in the drying furnace was carried out at the temperature of 100° C., with gradual heating up to 120° C. It was held in the thermal vacuum chamber at 300°. Porous structure assay results for the obtained specimen of organometallic gel (4) are given in Table 2.

EXAMPLE 5

It differs from Example 1 in the fact that the synthesis stage was carried out at the temperature of 130° C., with temperature increase up to 140° C., and then it was held at the temperature of 140° C. for 48 more hours; and the activation stage was carried out by the method of filtering with a solvent, dimethyl sulfoxide, heated up to the temperature of 40° C., and drying in the drying furnace was carried out at 100° C. with heating up to 140° C., and it was held in the thermal vacuum chamber at 160° C. Porous structure assay results for the obtained specimen of organometallic gel (5) are given in Table 2.

The group of inventions provided allows for production of an organometallic coordination polymer with gel structure, with developed inner surface consisting of micro and mesopores that, in comparison with similar materials, has higher thermal stability, and drying and activation parameters of which facilitate the maximum maintenance of porous characteristics obtained at the stage of synthesis which in general is the evidence that the technical result claimed is achieved.

TABLE 1

| Element | Wt, % | At, % |
| --- | --- | --- |
| Carbon—C | 46.16 | 55.37 |
| Oxygen—O | 43.35 | 39.03 |
| Aluminum—Al | 10.49 | 5.60 |

TABLE 2

| OMG | $V_0$, cm$^3$/g | $E_0$, kJ/mol | D, nm | E, kJ/mol | $S_{BET}$, m$^2$/g | $V_s$, cm$^3$/g | $S_{me}$, m$^2$/g | $V_{me}$, c$^m$/g |
| --- | --- | --- | --- | --- | --- | --- | --- | --- |
| (1) | 0.60 | 15.4 | 0.79 | 5.1 | 1700 | 1.8 | 430 | 1.20 |
| (2) | 0.50 | 15.0 | 0.80 | 5.0 | 1300 | 1.0 | 328 | 0.53 |
| (3) | 0.57 | 15.3 | 0.78 | 5.1 | 1560 | 1.1 | 350 | 0.56 |
| (4) | 0.51 | 15.1 | 0.80 | 5.0 | 1410 | 1.4 | 400 | 0.86 |
| (5) | 0.53 | 15.9 | 0.75 | 5.2 | 1530 | 1.7 | 439 | 1.22 |

What is claimed is:

1. A method for production of organometallic coordination polymer for accumulation of natural gas, methane, comprising:
   a stage of synthesis that consists of interaction of equimolar amounts of a crystalline hydrate of aluminum nitrate and a trimesic acid dissolved in an aprotonic polar organic solvent with boiling temperature over 80°

C., taken in equimolar or excessive amount related to the crystalline hydrate of aluminum nitrate and the trimesic acid;

wherein a solution of the aluminum nitrate crystalline hydrate is heated up to 110° C., a solution of trimesic acid is heated up to 80-110° C., and the heated trimesic acid solution is added dropwise to the heated aluminum nitrate solution with stirring at a rate of 5-15 vol. % per minute, and the solution mix is heated up to 140° C., held until sol is generated, and the sol is polymerized at 100-150° C. for 2-3 days until organometallic coordination polymer with gel structure is obtained; and an activation stage consisting of multiple washing of the synthesized organometallic coordination polymer with gel structure with an aprotonic polar organic solvent used at the synthesis stage and heated up to 40-60° C. in vacuum at pressure drop of at least 90 kPa, drying up to 24 hours at room temperature at first, and then at 100-150° C., thermal vacuum treatment up to 6 hours at the temperature of 120-300° C. and residual pressure of 0.26 kPa;

the activation stage is terminated upon stabilization of a weight of the organometallic coordination polymer with the gel structure.

2. An organometallic coordination polymer with a gel structure for accumulation of natural gas, methane, that is thermally stable at temperatures of at least 500° C. and has pores with effective inner diameter of 0.75-0.80 nm, specific area of 1300 to 1700 $m^2/g$, micropore volume of 0.5-0.6 $cm^3/g$, and summarized pore volume of 1.0-1.8 $cm^3/g$.

* * * * *